US011658340B2

(12) United States Patent
Lee et al.

(10) Patent No.: US 11,658,340 B2
(45) Date of Patent: May 23, 2023

(54) ELECTROLYTE COMPOSITION FOR LITHIUM SECONDARY BATTERY AND LITHIUM SECONDARY BATTERY INCLUDING THE SAME

(71) Applicant: LG CHEM, LTD., Seoul (KR)

(72) Inventors: Jae Won Lee, Daejeon (KR); Kyoung Ho Ahn, Daejeon (KR); Chul Haeng Lee, Daejeon (KR); Jung Hoon Lee, Daejeon (KR); Won Kyung Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 441 days.

(21) Appl. No.: 16/784,746

(22) Filed: Feb. 7, 2020

(65) Prior Publication Data
US 2020/0185771 A1 Jun. 11, 2020
US 2020/0185771 A1 Jun. 11, 2020

Related U.S. Application Data

(63) Continuation-in-part of application No. PCT/KR2018/015132, filed on Nov. 30, 2018.

(30) Foreign Application Priority Data

Dec. 1, 2017 (KR) .......................... 10-2017-0164113
Nov. 30, 2018 (KR) .......................... 10-2018-0151896

(51) Int. Cl.
| | | |
|---|---|---|
| H01M 10/0565 | (2010.01) | |
| H01M 10/0568 | (2010.01) | |
| H01M 10/0567 | (2010.01) | |
| H01M 10/0525 | (2010.01) | |
| C08F 216/14 | (2006.01) | |
| C08F 218/08 | (2006.01) | |
| C08F 220/36 | (2006.01) | |
| C08J 3/075 | (2006.01) | |
| C08K 3/32 | (2006.01) | |
| C08F 216/06 | (2006.01) | |

(52) U.S. Cl.
CPC ....... *H01M 10/0565* (2013.01); *C08F 216/06* (2013.01); *C08F 216/1458* (2013.01); *C08F 218/08* (2013.01); *C08F 220/36* (2013.01); *C08J 3/075* (2013.01); *C08K 3/32* (2013.01); *H01M 10/0525* (2013.01); *H01M 10/0567* (2013.01); *H01M 10/0568* (2013.01); *C08J 2329/04* (2013.01); *C08J 2329/10* (2013.01); *C08J 2331/04* (2013.01); *C08J 2333/14* (2013.01); *C08K 2003/324* (2013.01); *H01M 2300/0025* (2013.01); *H01M 2300/0082* (2013.01); *H01M 2300/0085* (2013.01); *H01M 2300/0091* (2013.01)

(58) Field of Classification Search
CPC ......... H01M 10/0565; H01M 10/0525; H01M 10/0567; H01M 10/0568; H01M 2300/0025; H01M 2300/0082; H01M 2300/0085; H01M 2300/0091; C08F 216/06; C08F 216/1458; C08F 218/08; C08F 220/36; C08J 3/075; C08J 2329/04; C08J 2329/10; C08J 2331/04; C08J 2333/14; C08K 3/32; C08K 2003/324
See application file for complete search history.

(56) References Cited

U.S. PATENT DOCUMENTS

| | | |
|---|---|---|
| 5,609,974 A | 3/1997 | Sun |
| 2004/0076885 A1 | 4/2004 | Sato et al. |
| 2011/0318645 A1 | 12/2011 | Han et al. |
| 2014/0302405 A1 | 10/2014 | Sasaki et al. |
| 2015/0188187 A1 | 7/2015 | Strand et al. |
| 2015/0288027 A1 | 10/2015 | Lee et al. |
| 2016/0233513 A1 | 8/2016 | Abe et al. |
| 2016/0268636 A1* | 9/2016 | Cha ..................... H01M 10/052 |

(Continued)

FOREIGN PATENT DOCUMENTS

| | | |
|---|---|---|
| CN | 1362711 A | 8/2002 |
| CN | 1505849 A | 6/2004 |
| CN | 105580173 A | 5/2016 |

(Continued)

OTHER PUBLICATIONS

Investigation of cyano resin-based gel polymer electroolyte: in situ gelation mechanism and electrode-electrolyte interfacial fabrication in lithium-ion battery; Dong Zhou et al, Journal of Materials Chemistry A, 2014, 2, 20059 (Year: 2014).*

(Continued)

*Primary Examiner* — Sarah A. Slifka
*Assistant Examiner* — Rachel L Zhang
(74) *Attorney, Agent, or Firm* — Morgan, Lewis & Bockius LLP

(57) ABSTRACT

The present invention relates to a thermosetting electrolyte composition for a lithium secondary battery and a lithium secondary battery including the same, and particularly, to a thermosetting electrolyte composition for a lithium secondary battery, which includes $LiPF_6$ as a first lithium salt, a non-aqueous organic solvent, and a polymer or oligomer containing a unit represented by Formula 1, wherein the polymer or oligomer containing the unit represented by Formula 1 is included in an amount of 0.6 wt % to 15 wt % based on a total weight of the thermosetting electrolyte composition for a lithium secondary battery, and a lithium secondary battery including the same.

18 Claims, No Drawings

(56) References Cited

U.S. PATENT DOCUMENTS

2018/0034101 A1  2/2018  Lee et al.
2019/0051937 A1  2/2019  Ahn et al.

FOREIGN PATENT DOCUMENTS

| JP | H11-510308 A | 9/1999 |
| JP | 2005-2079 A | 1/2005 |
| JP | 2006-307012 A | 11/2006 |
| JP | 2009-102608 A | 5/2009 |
| JP | 2009-256570 A | 11/2009 |
| KR | 10-2003-0089721 A | 11/2003 |
| KR | 10-2012-0000399 A | 1/2012 |
| KR | 10-1458468 B1 | 11/2014 |
| KR | 10-2015-0116737 A | 10/2015 |
| KR | 10-1648465 B1 | 8/2016 |
| KR | 10-2017-0113422 A | 10/2017 |
| WO | 2013/073288 A1 | 5/2013 |
| WO | 2014/042334 A1 | 3/2014 |
| WO | 2015/046304 A1 | 4/2015 |

OTHER PUBLICATIONS

Zhou et al., "Investigation of cyano resin-based gel polymer electrolyte: in situ gelation mechanism and electrode-electrolyte interfacial fabrication in lithium-ion battery", Journal of Materials Chemistry A, 2014, vol. 2, pp. 20059-20066.

International Search Report issued in corresponding International Patent Application No. PCT/KR2018/015132, dated Mar. 7, 2019.

Extended European Search Report dated Nov. 3, 2020 issued by the European Patent Office for corresponding European patent application No. 18884110.0.

Kim et al., "A physical organogel electrolyte: characterized by in situ thermo-irreversible gelation and single-ion-predominent conduction," Scientific Reports, 3, Article No. 1917 (2013).

Zhou et al., "In Situ Synthesis of a Hierarchical All-Solid-State Electrolyte Based on Nitrile Materials for High-Performance Lithium-Ion Batteries," Advanced Energy Materials, 2015, vol. 5, No. 15, 1500353.

\* cited by examiner

ELECTROLYTE COMPOSITION FOR LITHIUM SECONDARY BATTERY AND LITHIUM SECONDARY BATTERY INCLUDING THE SAME

CROSS-REFERENCE TO RELATED APPLICATIONS

This application claims the benefit of Korean Patent Application Nos. 2017-0164113, filed on Dec. 1, 2017, and 2018-0151896, filed on Nov. 30, 2018, in the Korean Intellectual Property Office, the disclosure of which is incorporated herein in its entirety by reference.

TECHNICAL FIELD

Technical Field

The present invention relates to an electrolyte composition for a lithium secondary battery and a lithium secondary battery including the same.

Background Art

Recently, there is a growing demand for high performance, high stability secondary batteries as electric, electronic, communication, and computer industries have rapidly developed. Particularly, in line with miniaturization and lightweight trends of electronic (communication) devices, thin-film and miniaturized lithium secondary batteries, as core components in this field, are required.

An electrolyte in a liquid state, for example, an ion conductive organic liquid electrolyte, in which an electrolyte salt is dissolved in a non-aqueous organic solvent, has been mainly used as an electrolyte in a lithium secondary battery. However, when the electrolyte in a liquid state is used, the possibilities of degrading an electrode material and volatizing the organic solvent are not only high, but also there is a disadvantageous in that stability is low due to combustion caused by increases in ambient temperature and temperature of the battery itself. In particular, the lithium secondary battery has limitations in that, since gas is generated in the battery due to the decomposition of a carbonate organic solvent and/or a side reaction between the organic solvent and an electrode during charge and discharge, a thickness of the battery increases, and an amount of the gas generated may be further increased because this reaction is accelerated during high-temperature storage.

Since the continuously generated gas causes an increase in internal pressure of the battery, it may not only cause a phenomenon, in which a center of a predetermined surface of the battery is deformed, for example, a prismatic type battery swells in a specific direction, but may also generate a local difference in adhesion on an electrode surface in the battery, and thus, an electrode reaction may not occur equally on the entire electrode surface.

Accordingly, research to commercialize a polymer electrolyte, such as a gel polymer electrolyte, instead of the electrolyte in a liquid state, has recently emerged.

Since the gel polymer electrolyte has excellent electrochemical stability in comparison to the liquid electrolyte, the thickness of the battery may not only be constantly maintained, but a stable thin-film type battery may also be prepared due to the inherent adhesion of a gel phase.

A secondary battery, in which the gel polymer electrolyte is used, may be prepared by the following two methods.

First, there is an injection type method in which, after a composition for a gel polymer electrolyte in a liquid state is prepared by dissociating a polymer or a monomer having a polymerizable site with a polymerization initiator in a liquid electrolyte solution in which a salt is dissolved, the composition is injected into a secondary battery including an electrode assembly in which a positive electrode, a negative electrode, and a separator are wound or stacked, and gelation (crosslinking) is then performed under appropriate temperature and time conditions to prepare a gel polymer electrolyte.

Also, there is a coating type method in which, after one surface or both surfaces of at least one of the electrode and the separator are coated with the composition for a gel polymer electrolyte in a liquid state as described above, gelation is performed by using heat or ultraviolet (UV) light to form a gel polymer electrolyte on the surface of the electrode or the separator, and a secondary battery is then assembled by using the same.

The injection type method is advantageous in that wetting of the electrolyte solution is better than that of the coating type method, but the injection type method is disadvantageous in that a side reaction is caused by the polymerization initiator or pre-gelation occurs due to a reaction with the polymerization initiator at room temperature before the injection of the composition for a gel polymer electrolyte into the secondary battery.

Thus, performance of the liquid injection process is not only difficult, but wetting of the battery is also reduced when the pre-gelation occurs before curing, and thus, overall performance, such as high-temperature stability, of the battery may be degraded. Thus, there is a need to develop a technique for preparing a gel polymer electrolyte in which the pre-gelation is prevented.

PRIOR ART DOCUMENT

Korean Patent Application Laid-open Publication No. 2003-0089721

DISCLOSURE OF THE INVENTION

Technical Problem

An aspect of the present invention provides a thermosetting electrolyte composition for a lithium secondary battery including a polymerizable polymer which may be gelated by heat.

Another aspect of the present invention provides a gel polymer electrolyte for a lithium secondary battery which is prepared by a thermal polymerization reaction of the thermosetting electrolyte composition.

Another aspect of the present invention provides a lithium secondary battery including the gel polymer electrolyte.

Technical Solution

According to an aspect of the present invention, there is provided a thermosetting electrolyte composition for a lithium secondary battery which includes:

$LiPF_6$ as a first lithium salt, a non-aqueous organic solvent, and a polymer or oligomer containing a unit represented by formula k, a unit represented by formula m, and a unit represented by formula n, wherein the polymer or oligomer is included in an amount of 0.6 wt % to 15 wt % based on a total weight of the thermosetting electrolyte composition for a lithium secondary battery:

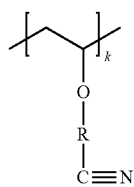

[Formula k]

wherein, in Formula k,
R is a substituted or unsubstituted alkylene group having 1 to 5 carbon atoms, and
k is a number of repeating unit, wherein k is an integer of 1 to 7,000.

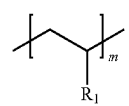

[Formula m]

wherein, in Formula m,
$R_1$ is —OH or

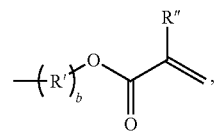

wherein R' is a substituted or unsubstituted alkylene group having 1 to 3 carbon atoms, R" is hydrogen, —OH, or a substituted or unsubstituted alkyl group having 1 to 3 carbon atoms, b is an integer of 0 or 1, and
m is a number of repeating units, wherein m is an integer of 0 to 2,000.

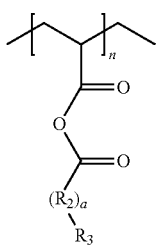

[Formula n]

wherein, in Formula n,
$R_2$ is a substituted or unsubstituted alkylene group having 1 to 5 carbon atoms or a substituted or unsubstituted alkenylene group having 2 to 5 carbon atoms,
$R_3$ is a substituted or unsubstituted cycloalkyl group having 3 to 10 carbon atoms which contains a ketone group or a substituted or unsubstituted heterocycloalkyl group having 2 to 10 carbon atoms which contains a ketone group,
a is an integer of 0 or 1,
n is a number of repeating units, wherein n is an integer of 0 to 600, and when m is 0, n is not 0.
Specially, the polymer or oligomer contains a unit represented by Formula 1 below,

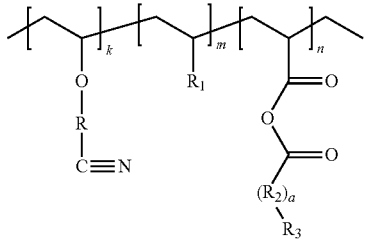

[Formula 1]

In Formula 1,
R is a substituted or unsubstituted alkylene group having 1 to 5 carbon atoms,
$R_1$ is —OH or

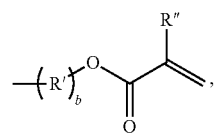

wherein R' is a substituted or unsubstituted alkylene group having 1 to 3 carbon atoms, R" is hydrogen, —OH, or a substituted or unsubstituted alkyl group having 1 to 3 carbon atoms, and b is an integer of 0 or 1,
$R_2$ is a substituted or unsubstituted alkylene group having 1 to 5 carbon atoms or a substituted or unsubstituted alkenylene group having 2 to 5 carbon atoms,
$R_3$ is a substituted or unsubstituted cycloalkyl group having 3 to 10 carbon atoms which contains a ketone group or a substituted or unsubstituted heterocycloalkyl group having 2 to 10 carbon atoms which contains a ketone group,
a is an integer of 0 or 1, and
k, m, and n are the numbers of repeating units,
wherein k is an integer of 1 to 7,000,
m is an integer of 0 to 2,000,
n is an integer of 0 to 600, and
wherein m and n are not 0 at the same time.
Also, in Formula 1, R may be an unsubstituted alkylene group having 1 to 3 carbon atoms,
$R_1$ may be —OH or

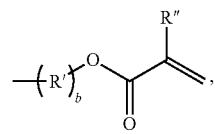

wherein R' may be an unsubstituted alkylene group having 1 to 2 carbon atoms, R" may be hydrogen, —OH, or an unsubstituted alkyl group having 1 to 2 carbon atoms, and b may be an integer of 0 or 1,
$R_2$ may be a substituted or unsubstituted alkenylene group having 2 to 5 carbon atoms, and
$R_3$ may be a substituted or unsubstituted heterocycloalkyl group having 2 to 6 carbon atoms which contains a ketone group.
In Formula 1, a molar ratio of the repeating unit k:the repeating unit (m+n) may be in a range of 70:30 to 99:1, for example, the molar ratio of the repeating unit k:the repeating unit (m+n) may be in a range of 75:25 to 90:10.

Specifically, the unit represented by Formula 1 may include one selected from the group consisting of units represented by Formulae 1a to 1 h.

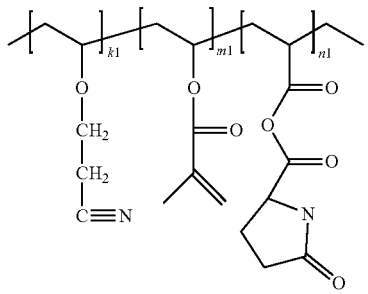

[Formula 1a]

In Formula 1a,
k1, m1, and n1 are the numbers of repeating units,
wherein k1 is an integer of 1 to 7,000,
m1 is an integer of 0 to 2,000, and
n1 is an integer of 0 to 600,
wherein m1 and n1 are not 0 at the same time.

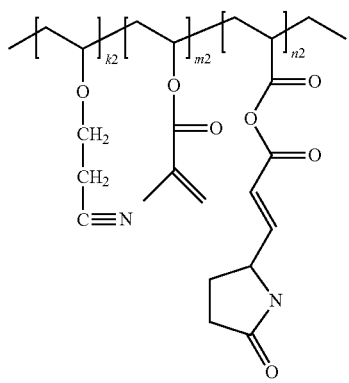

[Formula 1b]

In Formula 1b,
k2, m2, and n2 are the numbers of repeating units,
wherein k2 is an integer of 1 to 7,000,
m2 is an integer of 0 to 2,000, and
n2 is an integer of 0 to 600,
wherein m2 and n2 are not 0 at the same time.

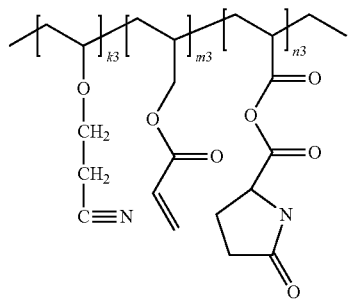

[Formula 1c]

In Formula 1c,
k3, m3, and n3 are the numbers of repeating units,
wherein k3 is an integer of 1 to 7,000,
m3 is an integer of 0 to 2,000, and
n3 is an integer of 0 to 600,
wherein m3 and n3 are not 0 at the same time.

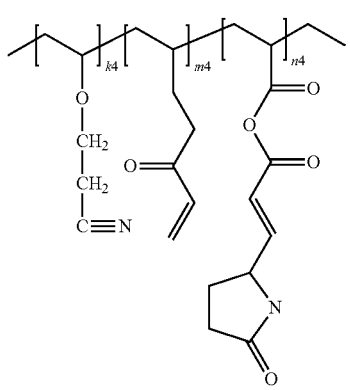

[Formula 1d]

In Formula 1d,
k4, m4, and n4 are the numbers of repeating units,
wherein k4 is an integer of 1 to 7,000,
m4 is an integer of 0 to 2,000, and
n4 is an integer of 0 to 600,
wherein m4 and n4 are not 0 at the same time.

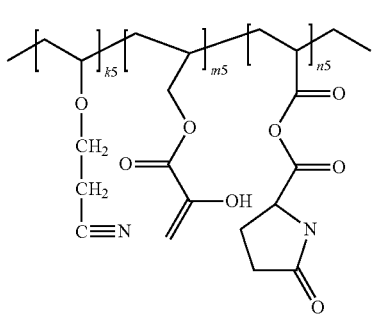

[Formula 1e]

In Formula 1e,
k5, m5, and n5 are the numbers of repeating units,
wherein k5 is an integer of 1 to 7,000,
m5 is an integer of 0 to 2,000, and
n5 is an integer of 0 to 600,
wherein m5 and n5 are not 0 at the same time.

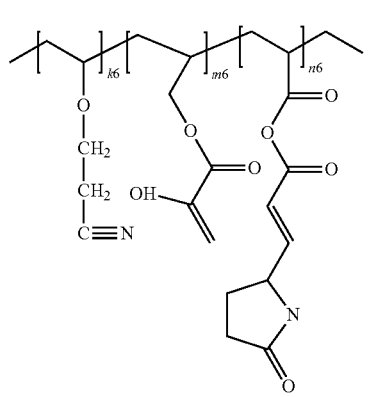

[Formula 1f]

In Formula 1f,
k6, m6, and n6 are the numbers of repeating units,
wherein k6 is an integer of 1 to 7,000,
m6 is an integer of 0 to 2,000, and n6 is an integer of 0 to 600,
wherein m6 and n6 are not 0 at the same time.

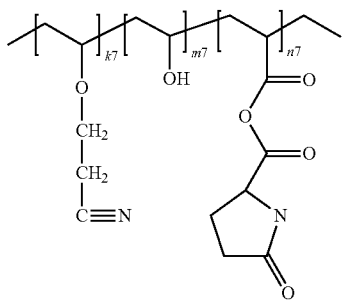

[Formula 1g]

In Formula 1g,
k7, m7, and n7 are the numbers of repeating units,
wherein k7 is an integer of 1 to 7,000,
m7 is an integer of 0 to 2,000, and
n7 is an integer of 0 to 600,
wherein m7 and n7 are not 0 at the same time.

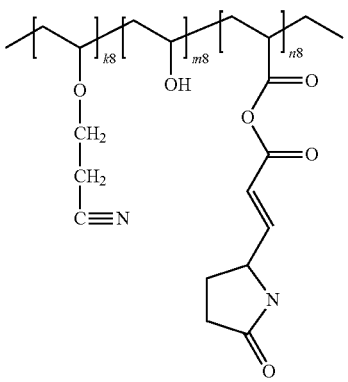

[Formula 1h]

In Formula 1h,
k8, m8, and n8 are the numbers of repeating units,
wherein k8 is an integer of 1 to 7,000,
m8 is an integer of 0 to 2,000, and
n8 is an integer of 0 to 600,
wherein m8 and n8 are not 0 at the same time.

Specifically, the unit represented by Formula 1 may be the unit represented by Formula 1a.

In Formula 1a, a molar ratio of the repeating unit k1:the repeating unit (m1+n1) may be in a range of 70:30 to 99:1, for example, the molar ratio of the repeating unit k1:the repeating unit (m1+n1) may be in a range of 75:25 to 90:10.

Also, the polymer or oligomer containing the unit represented by Formula 1 may be included in an amount of 1 wt % to 15 wt % based on the total weight of the thermosetting electrolyte composition for a lithium secondary battery.

Furthermore, the thermosetting electrolyte composition for a lithium secondary battery may further include a second lithium salt that is not $LiPF_6$.

The second lithium salt may include $Li^+$ as a cation, and may include at least one anion selected from the group consisting of $F^-$, $Cl^-$, $Br^-$, $I^-$, $NO_3^-$, $N(CN)_2^-$, $ClO_4^-$, $BF_4^-$, $AlO_4^-$, $AlCl_4^-$, $SbF_6^-$, $AsF_6^-$, $BF_2C_2O_4^-$, $BC_4O_8^-$, $PO_2F_2^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$, and the second lithium salt may specifically be $Li(FSO_2)_2N$.

According to another aspect of the present invention, there is provided a gel polymer electrolyte for a lithium secondary battery which is prepared by thermal polymerization of the thermosetting electrolyte composition for a lithium secondary battery of the present invention.

According to another aspect of the present invention, there is provided a lithium secondary battery including the gel polymer electrolyte of the present invention.

Advantageous Effects

According to the present invention, since a polymer or oligomer containing a cyano group, which may be polymerized by heat, instead of containing a polymerization initiator, is included, a thermosetting electrolyte composition for a lithium secondary battery capable of preventing pre-gelation at room temperature may be provided. Also, a gel polymer electrolyte, in which wetting is improved by using the composition, and a high-performance lithium secondary battery, in which high-temperature stability is improved by including the gel polymer electrolyte, may be prepared.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Thermosetting Electrolyte Composition for Lithium Secondary Battery

Specifically, in an embodiment of the present invention, provided is a thermosetting electrolyte composition for a lithium secondary battery which includes:
$LiPF_6$ as a first lithium salt,
a non-aqueous organic solvent, and
a polymer or oligomer containing a unit represented by formula k, a unit represented by formula m, and a unit represented by formula n,
wherein the polymer or oligomer is included in an amount of 0.6 wt % to 15 wt % based on a total weight of the thermosetting electrolyte composition for a lithium secondary battery:

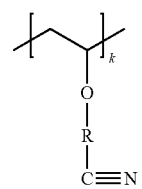

[Formula k]

wherein, in Formula k,
R is a substituted or unsubstituted alkylene group having 1 to 5 carbon atoms, and
k is a number of repeating unit, wherein k is an integer of 1 to 7,000.

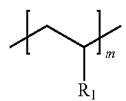

[Formula m]

wherein, in Formula m,
$R_1$ is —OH or

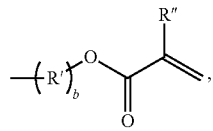

wherein R' is a substituted or unsubstituted alkylene group having 1 to 3 carbon atoms, R" is hydrogen, —OH, or a substituted or unsubstituted alkyl group having 1 to 3 carbon atoms, b is an integer of 0 or 1, and m is a number of repeating units, wherein m is an integer of 0 to 2,000.

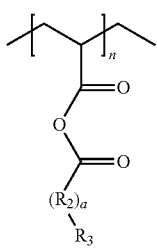

[Formula n]

wherein, in Formula n,
$R_2$ is a substituted or unsubstituted alkylene group having 1 to 5 carbon atoms or a substituted or unsubstituted alkenylene group having 2 to 5 carbon atoms, $R_3$ is a substituted or unsubstituted cycloalkyl group having 3 to 10 carbon atoms which contains a ketone group or a substituted or unsubstituted heterocycloalkyl group having 2 to 10 carbon atoms which contains a ketone group, a is an integer of 0 or 1, n is a number of repeating units, wherein n is an integer of 0 to 600, and when m is 0, n is not 0.

Specially, the polymer or oligomer contains a unit represented by Formula 1 below,

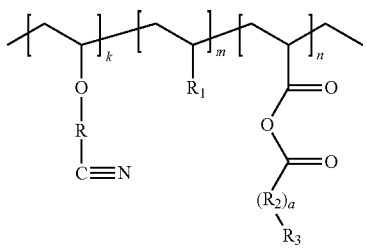

[Formula 1]

In Formula 1,
R is a substituted or unsubstituted alkylene group having 1 to 5 carbon atoms,
$R_1$ is —OH or

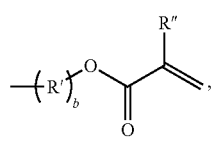

wherein R' is a substituted or unsubstituted alkylene group having 1 to 3 carbon atoms, R" is hydrogen, —OH, or a substituted or unsubstituted alkyl group having 1 to 3 carbon atoms, and b is an integer of 0 or 1, $R_2$ is a substituted or unsubstituted alkylene group having 1 to 5 carbon atoms or a substituted or unsubstituted alkenylene group having 2 to 5 carbon atoms, $R_3$ is a substituted or unsubstituted cycloalkyl group having 3 to 10 carbon atoms which contains a ketone group or a substituted or unsubstituted heterocycloalkyl group having 2 to 10 carbon atoms which contains a ketone group, a is an integer of 0 or 1, and k, m, and n are the numbers of repeating units, wherein k is an integer of 1 to 7,000, m is an integer of 0 to 2,000, and n is an integer of 0 to 600, wherein m and n are not 0 at the same time.

(1) First Lithium Salt

First, the thermosetting electrolyte composition for a lithium secondary battery of the present invention includes $LiPF_6$ as a first lithium salt.

$LiPF_6$, as the first lithium salt, generates $PF_5$ while being thermally decomposed by heat during a curing process for gelation, and the generated $PF_5$ may act as a polymerization initiator. That is, the cyano group, as a substituent contained in the compound represented by Formula 1, undergoes cationic polymerization by the $PF_5$ generated by heat. As a result, crosslinking is formed between the units represented by Formula 1 and curing occurs to cause gelation.

The $LiPF_6$, as the first lithium salt, may be included in a concentration of 0.2 M to 2 M, for example, 0.5 M to 1.5 M. In a case in which the concentration of the electrolyte salt is greater than 2 M, since viscosity of an electrolyte for a lithium secondary battery is excessively increased, wetting of the electrolyte may be reduced and a film-forming effect may be reduced. In a case in which the concentration of the lithium salt is less than 0.2 M, since a gelation reaction effect is reduced, mechanical strength of the gel polymer electrolyte may not be sufficiently secured.

(2) Organic Solvent

Also, the thermosetting electrolyte composition of the present invention includes a non-aqueous organic solvent.

The non-aqueous organic solvent is not limited as long as it may minimize decomposition due to an oxidation reaction during charge and discharge of the secondary battery and may exhibit desired characteristics with an additive.

The organic solvent may include at least one organic solvent selected from the group consisting of a cyclic carbonate-based organic solvent, a linear carbonate-based organic solvent, a linear ester-based organic solvent, and a cyclic ester-based organic solvent.

Specifically, the organic solvent may include the cyclic carbonate-based organic solvent and the linear carbonate-based organic solvent.

Specific examples of the cyclic carbonate-based organic solvent may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, or a mixture of two or more thereof, and, among them, the cyclic carbonate-based organic solvent may include ethylene carbonate which well dissociates the lithium salt in the electrolyte due to high permittivity as a highly viscous organic solvent.

Also, the linear carbonate-based organic solvent, as an organic solvent with low viscosity and low permittivity, may include at least one selected from the group consisting of dimethyl carbonate (DMC), diethyl carbonate (DEC), dipropyl carbonate, ethylmethyl carbonate (EMC), methylpropyl carbonate, and ethylpropyl carbonate as a typical example.

Furthermore, the organic solvent may further include the linear ester-based organic solvent and/or the cyclic ester-based organic solvent to prepare a thermosetting electrolyte composition having high electrical conductivity.

Specific examples of the linear ester-based organic solvent may be at least one selected from the group consisting of methyl acetate, ethyl acetate, propyl acetate, methyl propionate, ethyl propionate, propyl propionate, and butyl propionate.

Also, the cyclic ester-based organic solvent may include at least one selected from the group consisting of γ-butyrolactone, γ-valerolactone, γ-caprolactone, σ-valerolactone, and ε-caprolactone.

Furthermore, an organic solvent typically used during the preparation of an electrolyte solution may be further used without limitation as the organic solvent, if necessary. For example, at least one organic solvent selected from an ether-based organic solvent and a nitrile-based organic solvent may be further included.

The ether-based organic solvent may include any one selected from the group consisting of dimethyl ether, diethyl ether, dipropyl ether, methylethyl ether, methylpropyl ether, and ethylpropyl ether.

The nitrile-based organic solvent, for example, may include any one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

(3) Polymer or Oligomer

Also, the thermosetting electrolyte composition for a lithium secondary battery of the present invention includes a polymer or oligomer containing a unit represented by formula k, a unit represented by formula m, and a unit represented by formula n.

[Formula k]

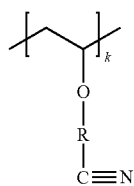

wherein, in Formula k,

R is a substituted or unsubstituted alkylene group having 1 to 5 carbon atoms, and k is a number of repeating unit, wherein k is an integer of 1 to 7,000.

[Formula m]

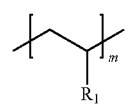

wherein, in Formula m, $R_1$ is —OH or

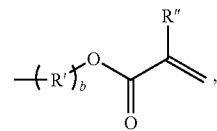

wherein R' is a substituted or unsubstituted alkylene group having 1 to 3 carbon atoms, R" is hydrogen, —OH, or a substituted or unsubstituted alkyl group having 1 to 3 carbon atoms, b is an integer of 0 or 1, and m is a number of repeating units, wherein m is an integer of 0 to 2,000.

[Formula n]

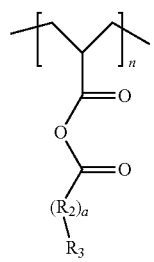

wherein, in Formula n, $R_2$ is a substituted or unsubstituted alkylene group having 1 to 5 carbon atoms or a substituted or unsubstituted alkenylene group having 2 to 5 carbon atoms, $R_3$ is a substituted or unsubstituted cycloalkyl group having 3 to 10 carbon atoms which contains a ketone group or a substituted or unsubstituted heterocycloalkyl group having 2 to 10 carbon atoms which contains a ketone group, a is an integer of 0 or 1, n is a number of repeating units, wherein n is an integer of 0 to 600, and when m is 0, n is not 0.

Specially, the polymer or oligomer contains a unit represented by Formula 1 which has a reaction site where thermal polymerization is possible in the absence of a polymerization initiator.

[Formula 1]

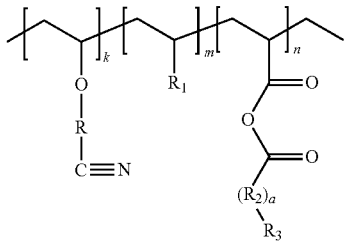

In Formula 1,

R is a substituted or unsubstituted alkylene group having 1 to 5 carbon atoms, $R_1$ is —OH or

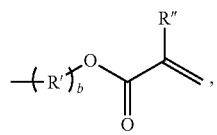

wherein R' is a substituted or unsubstituted alkylene group having 1 to 3 carbon atoms, R" is hydrogen, —OH, or a substituted or unsubstituted alkyl group having 1 to 3 carbon atoms, and b is an integer of 0 or 1, $R_2$ is a substituted or unsubstituted alkylene group having 1 to 5 carbon atoms or a substituted or unsubstituted alkenylene group having 2 to 5 carbon atoms, $R_3$ is a substituted or unsubstituted cycloalkyl group having 3 to 10 carbon atoms which contains a ketone group or a substituted or unsubstituted heterocycloalkyl group having 2 to 10 carbon atoms which contains a ketone group, a is an integer of 0 or 1, and k, m, and n are the numbers of repeating units, wherein k is an integer of 1 to 7,000, m is an integer of 0 to 2,000, and n is an integer of 0 to 600, wherein m and n are not 0 at the same time.

Specifically, in Formula 1, R may be an unsubstituted alkylene group having 1 to 3 carbon atoms, $R_1$ may be —OH or

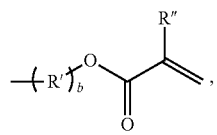

wherein R' may be an unsubstituted alkylene group having 1 to 2 carbon atoms, R" may be hydrogen, —OH, or an unsubstituted alkyl group having 1 to 2 carbon atoms, and b may be an integer of 0 or 1, $R_2$ may be a substituted or unsubstituted alkenylene group having 2 to 5 carbon atoms, and $R_3$ may be a substituted or unsubstituted heterocycloalkyl group having 2 to 6 carbon atoms which contains a ketone group.

Also, in Formula 1, a molar ratio of the repeating unit k:the repeating unit (m+n) may be in a range of 70:30 to 99:1, for example, the molar ratio of the repeating unit k:the repeating unit (m+n) may be in a range of 75:25 to 90:10.

If the molar ratio of the repeating unit (m+n) to the repeating unit k is less than 1, since a crosslinking reaction rate for gelation is reduced, it is difficult to form a stable gel polymer electrolyte, and thus, adhesion between an electrode and a separator is reduced so that an effect of improving stability against thermal, mechanical, and electrical shock may be insignificant.

Furthermore, if the molar ratio of the repeating unit (m+n) to the repeating unit k is greater than 30, since a side reaction occurs due to an increase in hygroscopicity, it is difficult to control a gelation reaction rate, and thus, there is a limitation in that gelation occurs before being sufficiently wetted in a cell.

That is, since the polymer or oligomer containing the unit represented by Formula 1 contains a cyano group (CN) and a hydroxyl group (OH—) in a structure, a cross-linking polymerization reaction is caused by an anion, for example, $PF_6^-$, generated from the Li salt present in the thermosetting electrolyte composition without a separate polymerization initiator at room temperature (25° C.±10° C.), for example, when applying heat at a temperature of 40° C. or more, specifically, 60° C. or more, and thus, gelation occurs. A gel polymer electrolyte including a polymer matrix, which is stable at high temperatures and has a strong adhesion to a positive electrode, may be prepared by the crosslinking. As a result, since loss of an active material is suppressed by suppressing diffusion of metal, such as nickel (Ni), cobalt (Co), and manganese (Mn), dissolved from the positive electrode during high temperature storage, lithium polysulfide generated during charge and discharge is effectively controlled, or an $O_2$ or O radical generated due to collapse of the positive electrode is inhibited from moving to the electrolyte and undergoing a direct side reaction with the electrolyte, thermal runaway may be prevented. Furthermore, since the prepared gel polymer electrolyte increases the adhesion between the electrode and the separator to prevent the separator from shrinking at high temperature exposure, an effect of improving thermal stability of the secondary battery may be achieved even in a high-temperature storage environment such as a hot box test.

Specifically, the unit represented by Formula 1 may be one selected from the group consisting of units represented by Formulae 1a to 1 h.

[Formula 1a]

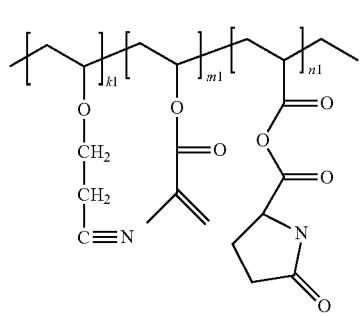

In Formula 1a, k1, m1, and n1 are the numbers of repeating units, wherein k1 is an integer of 1 to 7,000, m1 is an integer of 0 to 2,000, and n1 is an integer of 0 to 600, wherein m1 and n1 are not 0 at the same time.

Specifically, in Formula 1a, a molar ratio of the repeating unit k1:the repeating unit (m1+n1) may be in a range of 70:30 to 99:1, for example, the molar ratio of the repeating unit k1:the repeating unit (m1+n1) may be in a range of 75:25 to 90:10.

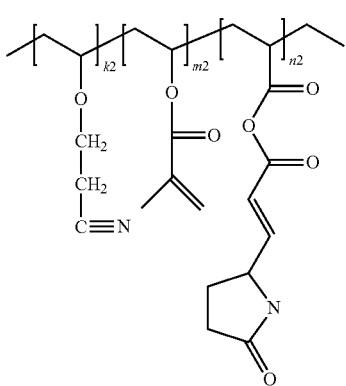

[Formula 1b]

In Formula 1b, k2, m2, and n2 are the numbers of repeating units, wherein k2 is an integer of 1 to 7,000, m2 is an integer of 0 to 2,000, and n2 is an integer of 0 to 600, wherein m2 and n2 are not 0 at the same time.

Specifically, in Formula 1b, a molar ratio of the repeating unit k2:the repeating unit (m2+n2) may be in a range of 70:30 to 99:1, for example, the molar ratio of the repeating unit k2:the repeating unit (m2+n2) may be in a range of 75:25 to 90:10.

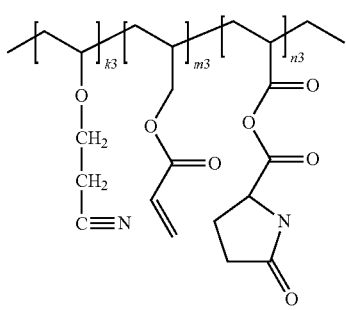

[Formula 1c]

In Formula 1c, k3, m3, and n3 are the numbers of repeating units, wherein k3 is an integer of 1 to 7,000, m3 is an integer of 0 to 2,000, and n3 is an integer of 0 to 600, wherein m3 and n3 are not 0 at the same time.

Specifically, in Formula 1c, a molar ratio of the repeating unit k3:the repeating unit (m3+n3) may be in a range of 70:30 to 99:1, for example, the molar ratio of the repeating unit k3:the repeating unit (m3+n3) may be in a range of 75:25 to 90:10.

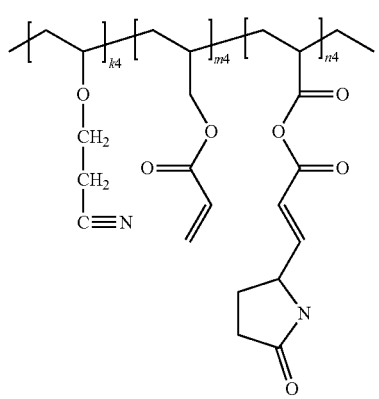

[Formula 1d]

In Formula 1d, k4, m4, and n4 are the numbers of repeating units, wherein k4 is an integer of 1 to 7,000, m4 is an integer of 0 to 2,000, and n4 is an integer of 0 to 600, wherein m4 and n4 are not 0 at the same time.

Specifically, in Formula 1d, a molar ratio of the repeating unit k4:the repeating unit (m4+n4) may be in a range of 70:30 to 99:1, for example, the molar ratio of the repeating unit k4:the repeating unit (m4+n4) may be in a range of 75:25 to 90:10.

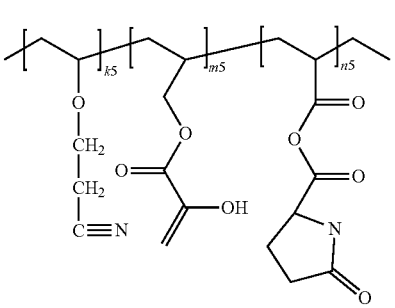

[Formula 1e]

In Formula 1e, k5, m5, and n5 are the numbers of repeating units, wherein k5 is an integer of 1 to 7,000, m5 is an integer of 0 to 2,000, and n5 is an integer of 0 to 600, wherein m5 and n5 are not 0 at the same time.

Specifically, in Formula 1e, a molar ratio of the repeating unit k5:the repeating unit (m5+n5) may be in a range of 70:30 to 99:1, for example, the molar ratio of the repeating unit k5:the repeating unit (m5+n5) may be in a range of 75:25 to 90:10.

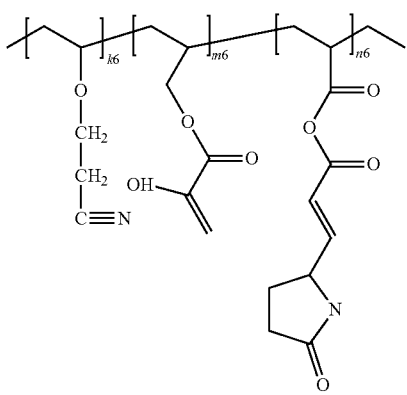

[Formula 1f]

In Formula 1f, k6, m6, and n6 are the numbers of repeating units, wherein k6 is an integer of 1 to 7,000, m6 is an integer of 0 to 2,000, and n6 is an integer of 0 to 600, wherein m6 and n6 are not 0 at the same time.

Specifically, in Formula 1f, a molar ratio of the repeating unit k6:the repeating unit (m6+n6) may be in a range of 70:30 to 99:1, for example, the molar ratio of the repeating unit k6:the repeating unit (m6+n6) may be in a range of 75:25 to 90:10.

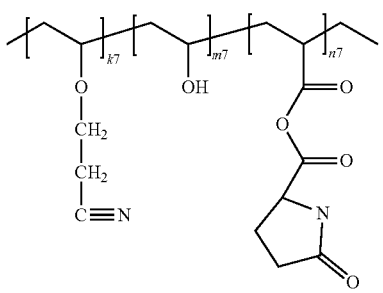

[Formula 1g]

In Formula 1g, k7, m7, and n7 are the numbers of repeating units, wherein k7 is an integer of 1 to 7,000, m7 is an integer of 0 to 2,000, and n7 is an integer of 0 to 600, wherein m7 and n7 are not 0 at the same time.

Specifically, in Formula 1g, a molar ratio of the repeating unit k7:the repeating unit (m7+n7) may be in a range of 70:30 to 99:1, for example, the molar ratio of the repeating unit k7:the repeating unit (m7+n7) may be in a range of 75:25 to 90:10.

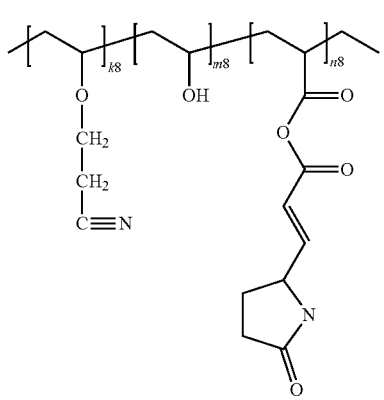

[Formula 1h]

In Formula 1h, k8, m8, and n8 are the numbers of repeating units, wherein k8 is an integer of 1 to 7,000, m8 is an integer of 0 to 2,000, and n8 is an integer of 0 to 600, wherein m8 and n8 are not 0 at the same time.

Specifically, in Formula 1h, a molar ratio of the repeating unit k8:the repeating unit (m8+n8) may be in a range of 70:30 to 99:1, for example, the molar ratio of the repeating unit k8:the repeating unit (m8+n8) may be in a range of 75:25 to 90:10.

Specifically, the unit represented by Formula 1 may be the unit represented by Formula 1a.

The polymer or oligomer containing the unit represented by Formula 1 may be included in an amount of 0.6 wt % to 15 wt %, particularly 1 wt % to 15 wt %, and more particularly 1 wt % to 10 wt %, for example, 1 wt % to 7 wt % based on a total electrolyte weight of the thermosetting electrolyte composition for a lithium secondary battery.

If the amount of the polymer or oligomer containing the unit represented by Formula 1 is 0.6 wt % or more, the adhesion between the electrode and the separator is improved, and a gel polymer electrolyte capable of securing sufficient mechanical strength may be prepared. Also, if the amount of the polymer or oligomer containing the unit represented by Formula 1 is 15 wt % or less, for example, 10 wt % or less, a disadvantage, such as an increase in resistance and a reduction in ionic conductivity due to the excessive amount of the polymer or oligomer, may not only be prevented, but wetting properties of the electrolyte composition may also be improved.

If the amount of the polymer or oligomer containing the unit represented by Formula 1 is less than 0.6 wt %, a gel-forming effect is reduced so that a stable gel polymer electrolyte may not be prepared, and, if the amount of the polymer or oligomer containing the unit represented by Formula 1 is greater than 15 wt %, since the resistance is increased while the excessive amount of the polymer or oligomer is not dissolved but remains in the non-aqueous organic solvent, the battery becomes inoperable, and thus, it may be difficult to prepare a gel polymer electrolyte having a desired performance.

The polymer or oligomer containing the unit represented by Formula 1 is a crosslinked polymer or oligomer having a weight-average molecular weight (Mw) of 500,000 or less which may be gelated by a thermal polymerization reaction at a temperature of 60° C. or more, wherein the weight-average molecular weight may be controlled by the number of repeating units. Specifically, the weight-average molecular weight of the polymer or oligomer may be in a range of 5,000 to 500,000, for example, 5,000 to 380,000, and, in a case in which the weight-average molecular weight of the polymer is within the above range, mechanical strength of the battery including the same may not only be effectively improved, but also an effect of improving the stability is excellent and an effect of improving the wetting properties of the thermosetting electrolyte composition may be achieved. That is, in a case in which the weight-average molecular weight of the polymer or oligomer containing the unit represented by Formula 1 is 500,000 or less, for example, 380,000 or less, an effect of improving impregnation of the thermosetting electrolyte composition into electrode pores and separator pores may be achieved.

In this case, the weight-average molecular weight of the polymer or oligomer may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

Also, viscosity (DMF, 20%, 25° C.) of the polymer or oligomer containing the unit represented by Formula 1 may be controlled by the number of repeating units, and the polymer or oligomer containing the unit represented by Formula 1 may specifically have a viscosity of 130 cPs to 160 cPs, for example, 135 cPs to 155 cPs.

In a case in which the viscosity of the polymer or oligomer containing the unit represented by Formula 1 is within the above range, impregnation characteristics of the thermosetting electrolyte composition are easily secured. That is, in a case in which the viscosity of the polymer or oligomer containing the unit represented by Formula 1 is 130 cPs or more, an effect of restricting the movement of a sulfide-based compound may be achieved, and, in a case in which the viscosity of the polymer or oligomer containing the unit represented by Formula 1 is 160 cPs or less, impregnability of the thermosetting electrolyte composition over a certain range may be secured.

After the polymer or oligomer containing the unit represented by Formula 1 was dissolved in dimethyl formamide (DMF) at a concentration of 20%, the viscosity was measured at 25° C. with a LV DV-II+ Pro viscometer (cone-plate type) by Brookfield, and, during the measurement, a spindle was S40, an rpm was 15, and a sample loading amount was 1 mL.

Specifically, since the polymer or oligomer containing the unit represented by Formula 1 contains a cyano group (—CN) as an end group in the structure, an irreversible cross-linking reaction by heat may occur without a polymerization initiator in the battery.

That is, when $PF_5$ is generated from $LiPF_6$, as the first lithium salt, present in the thermosetting electrolyte composition by heat, the $PF_5$ reacts with $H_2O$ remaining in the thermosetting electrolyte composition to form $H^+$ $(PF_5OH)^-$. Subsequently, the $H^+$ $(PF_5OH)^-$ is bonded to the cyano group (—CN) of the polymer or oligomer containing the unit represented by Formula 1 to form a $HN=C^+$ $(PF_5OH)^-$ group, and the $HN=C^+(PF_5OH)^-$ group cross-links with a cyano group (—CN) of another polymer or oligomer containing the unit represented by Formula 1. As a result, gelation may occur because a polymerization reaction is caused by heat even if a separate polymerization initiator is not included. Thus, it is possible to effectively prevent a pre-gelation reaction caused by a polymerization initiator during the preparation of a conventional gel polymer electrolyte.

Furthermore, with respect to a gel polymer electrolyte including a general polymerization initiator, a trace amount of N2 gas is generated from the polymerization initiator while the polymerization initiator generates radicals, and the gas thus generated remains in the gel polymer electrolyte to cause the formation of a non-uniform film. Thus, interfacial resistance may be increased and precipitation of lithium dendrites may occur. Also, since the polymerization initiator remaining after the generation of the radicals from the polymerization initiator remains in the polymer matrix in the gel polymer electrolyte after the reaction, it may cause an increase in resistance.

In contrast, since the polymer or oligomer containing the unit represented by Formula 1 used in the present invention does not require a polymerization initiator during the gelation reaction, problems of the N2 gas generation and the increased in the resistance due to the remaining polymerization initiator may be improved. Particularly, in a case in which a gel polymer electrolyte including the polymer or oligomer represented by Formula 1 is used in a secondary battery including a Ni-rich positive electrode, since a polymer matrix is formed in which adhesion between the gel polymer electrolyte and the positive electrode is strongly maintained during high-temperature exposure, an $O_2$ or O radical generated by the collapse of a positive electrode structure during the high-temperature exposure is inhibited from moving to the electrolyte and undergoing a direct side reaction with the electrolyte, and thus, a calorific value may be decreased to prevent the occurrence of thermal runaway. Therefore, high-temperature stability of the secondary battery including the Ni-rich positive electrode may be further improved.

(4) Second Lithium Salt $Li^+$ ions may be consumed while a portion of the $LiPF_6$, as the first lithium salt, participates in the polymerization reaction during the gelation reaction of the thermosetting electrolyte composition for a lithium secondary battery of the present invention. Thus, in the present invention, a second lithium salt, excluding the $LiPF_6$, may be included together to prevent the consumption of the $Li^+$ ions in the thermosetting electrolyte composition for a lithium secondary battery.

The second lithium salt may be used without particular limitation as long as it is a compound capable of providing lithium ions used in a lithium secondary battery, and, as a representative example, the second lithium salt may include $Li^+$ as a cation, and may include at least one selected from the group consisting of $F^-$, $Cl^-$, $Br^-$, $I^-$, $NO_3^-$, $N(CN)_2^-$, $ClO_4^-$, $BF_4^-$, $AlO_4^-$, $AlCl_4^-$, $SbF_6^-$, $AsF_6^-$, $BF_2C_2O_4^-$, $BC_4O_8^-$, $PO_2F_2^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH$, $CF_3(CF_2)_7SO_3^-$, $CF_3CO_2^-$, $CH_3CO_2^-$, $SCN^-$, and $(CF_3CF_2SO_2)_2N^-$ as an anion. The second lithium salt may specifically be lithium bis(fluorosulfonyl)imide $(Li(FSO_2)_2N)$.

A molar ratio of the first lithium salt:the second lithium salt may be in a range of 1:9 to 9:1.

In a case in which the molar ratio of the first lithium salt to the second lithium salt is within the above range, an effect of safely improving output of the lithium secondary battery may be achieved. In this case, if the molar ratio of the second lithium salt to the first lithium salt is greater than 9, since corrosion of an electrode collector occurs during charge and discharge, the high-temperature stability of the secondary battery may be reduced.

Gel Polymer Electrolyte

Also, in an embodiment of the present invention, a gel polymer electrolyte for a lithium secondary battery, which is formed by thermal polymerization of the thermosetting electrolyte composition for a lithium secondary battery in an inert atmosphere, may be provided.

Specifically, after injecting the thermosetting electrolyte composition into the secondary battery, the gel polymer electrolyte may be prepared by curing the thermosetting electrolyte composition by thermal polymerization.

The thermal polymerization reaction takes about 2 minutes to about 48 hours, and may be performed in a temperature range of 60° C. to 100° C., for example, 60° C. to 80° C.

Lithium Secondary Battery

Furthermore, in an embodiment of the present invention, a lithium secondary battery including a negative electrode, a positive electrode, a separator disposed between the negative electrode and the positive electrode, and the gel polymer electrolyte for a lithium secondary battery of the present invention may be provided.

After an electrode assembly formed by sequentially stacking the positive electrode, the negative electrode, and the separator selectively disposed between the positive electrode and the negative electrode is accommodated in a secondary battery case or a case, the electrolyte composition for a lithium secondary battery is injected thereinto, and the lithium secondary battery of the present invention may be prepared by curing the injected electrolyte composition for a lithium secondary battery by thermal polymerization.

In the lithium secondary battery of the present invention, those prepared by typical methods and used in the preparation of the lithium secondary battery may all be used as the positive electrode, the negative electrode, and the separator.

(1) Positive Electrode

First, the positive electrode may be prepared by forming a positive electrode material mixture layer on a positive electrode collector. The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiN_{1-Y1}Co_{Y1}O_2$ (where 0<Y1<1)), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

In a case in which the gel polymer electrolyte including the polymer or oligomer represented by Formula 1 of the present invention is used, since the polymer matrix, in which the adhesion between the gel polymer electrolyte and the positive electrode is strongly maintained, is present, the $O_2$ or O radical generated by the collapse of the positive electrode structure during the high-temperature exposure is prevented from moving to the electrolyte and undergoing the direct side reaction with the electrolyte, and thus, the occurrence of thermal runaway may be prevented. Therefore, the high-temperature stability of the lithium secondary battery including the Ni-rich positive electrode, such as the above-described positive electrode active material, specifically, $Li(Ni_{0.7}Mn_{0.15}Co_{0.15})O_2$ and $Li(Ni_{0.8}Mn_{0.1}Co_{0.1})O_2$), may be further improved.

The positive electrode active material may be included in an amount of 80 wt % to 99 wt %, for example, 85 wt % to 95 wt % based on a total weight of solid content in the positive electrode slurry. In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

(2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0<x<1$), $Li_xWO_2$ ($0<x<1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0<x<1$; $1<y<3$; $1<z<8$) may be used as the metal composite oxide.

The material, which may be doped and undoped with lithium, may include Si, $SiO_x$ ($0<x<2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

(3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Examples

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

Example 1

(Thermosetting Electrolyte Composition Preparation)

A thermosetting electrolyte composition for a lithium secondary battery was prepared by adding 3 g of a polymer including the unit represented by Formula 1a (weight-average molecular weight: 95,000, k1:750, m1:150, n1:50) to 97 g of a non-aqueous organic solvent (ethylene carbonate (EC):ethyl methyl carbonate (EMC)=volume ratio of 3:7) in which 0.5 M $LiPF_6$ and 0.7 M LiFSI were dissolved.

(Electrode Assembly Preparation)

$Li(Ni_{0.8}Mn_{0.1}Co_{0.1})O_2$ (NCM) as a positive electrode active material, carbon black as a conductive agent, and polyvinylidene fluoride (PVDF), as a binder, were added in a weight ratio of 95:3:2 to N-methyl-2-pyrrolidone (NMP), as a solvent, to prepare a positive electrode mixture slurry. An about 12 μm thick aluminum (Al) thin film, as a positive electrode collector, was coated with the positive electrode mixture slurry and dried, and the coated Al thin film was then roll-pressed to prepare a positive electrode.

Graphite as a negative electrode active material, PVDF as a binder, and carbon black, as a conductive agent, were added in a weight ratio of 96:3:1 to NMP, as a solvent, to prepare a negative electrode mixture slurry. An 8 μm thick copper (Cu) thin film, as a negative electrode collector, was coated with the negative electrode mixture slurry and dried, and the coated Cu thin film was then roll-pressed to prepare a negative electrode.

An electrode assembly was prepared by sequentially stacking the above-prepared positive electrode, a porous polyolefin separator having both surfaces coated with an inorganic material ($Al_2O_3$), and the above-prepared negative electrode.

(Secondary Battery Preparation)

After the assembled electrode assembly was put in a battery case and the above thermosetting electrolyte composition was injected thereinto, thermal polymerization was performed at 60° C. to prepare a lithium secondary battery including a gel polymer electrolyte.

Example 2

A thermosetting electrolyte composition for a lithium secondary battery and a lithium secondary battery including a gel polymer electrolyte prepared therefrom were prepared in the same manner as in Example 1 except that 5 g of the polymer including the unit represented by Formula 1a was added to 95 g of the non-aqueous organic solvent (ethylene carbonate (EC):ethyl methyl carbonate (EMC)=volume ratio of 3:7), in which 0.5 M $LiPF_6$ and 0.7 M LiFSI were dissolved, during the preparation of the thermosetting electrolyte composition.

Example 3

A thermosetting electrolyte composition for a lithium secondary battery and a lithium secondary battery including a gel polymer electrolyte prepared therefrom were prepared in the same manner as in Example 1 except that 10 g of the polymer including the unit represented by Formula 1a was added to 90 g of the non-aqueous organic solvent (ethylene carbonate (EC):ethyl methyl carbonate (EMC)=volume ratio of 3:7), in which 0.5 M $LiPF_6$ and 0.7 M LiFSI were dissolved, during the preparation of the thermosetting electrolyte composition.

Example 4

A thermosetting electrolyte composition for a lithium secondary battery and a lithium secondary battery including a gel polymer electrolyte prepared therefrom were prepared in the same manner as in Example 1 except that 1 g of the polymer including the unit represented by Formula 1a was added to 99 g of the non-aqueous organic solvent (ethylene carbonate (EC):ethyl methyl carbonate (EMC)=volume ratio of 3:7), in which 0.5 M $LiPF_6$ and 0.7 M LiFSI were dissolved, during the preparation of the thermosetting electrolyte composition.

Example 5

A thermosetting gel polymer electrolyte and a lithium secondary battery including the same were prepared in the same manner as in Example 1 except that a lithium cobalt oxide ($LiCoO_2$), instead of $Li(Ni_{0.8}Mn_{0.1}Co_{0.1})O_2$ (NCM), was used as a positive electrode active material, and $LiPF_6$, as a first lithium salt, was used alone during the preparation of a lithium secondary battery.

Comparative Example 1

A thermosetting electrolyte composition for a lithium secondary battery and a lithium secondary battery including a gel polymer electrolyte prepared therefrom were prepared in the same manner as in Example 1 except that 0.1 g of the polymer including the unit represented by Formula 1a was added to 99.9 g of the non-aqueous organic solvent (ethylene carbonate (EC):ethyl methyl carbonate (EMC)=volume ratio of 3:7), in which 0.5 M LiPF$_6$ and 0.7 M LiFSI were dissolved, during the preparation of the thermosetting electrolyte composition.

Comparative Example 2

A thermosetting electrolyte composition for a lithium secondary battery and a lithium secondary battery including a gel polymer electrolyte prepared therefrom were prepared in the same manner as in Example 1 except that 20 g of the polymer including the unit represented by Formula 1a was added to 80 g of the non-aqueous organic solvent (ethylene carbonate (EC):ethyl methyl carbonate (EMC)=volume ratio of 3:7), in which 0.5 M LiPF$_6$ and 0.7 M LiFSI were dissolved, during the preparation of the thermosetting electrolyte composition.

Comparative Example 3

(Preparation of Composition for Gel Polymer Electrolyte)
A composition for a gel polymer electrolyte was prepared by adding 5 g of an oligomer represented by the following Formula 3 (weight-average molecular weight: 4,000) and 0.05 g of a polymerization initiator (AIBN) to 94.95 g of a non-aqueous organic solvent (ethylene carbonate (EC):ethyl methyl carbonate (EMC)=volume ratio of 3:7) in which 0.5 M LiPF$_6$ and 0.7 M LiFSI were dissolved.

[Formula 3]

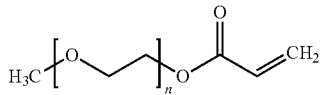

(Electrode Assembly Preparation)
Li(Ni$_{0.8}$Mn$_{0.1}$Co$_{0.1}$)O$_2$ (NCM) as a positive electrode active material, carbon black as a conductive agent, and polyvinylidene fluoride (PVDF), as a binder, were added in a weight ratio of 95:3:2 to N-methyl-2-pyrrolidone (NMP), as a solvent, to prepare a positive electrode mixture slurry. An about 12 μm thick aluminum (Al) thin film, as a positive electrode collector, was coated with the positive electrode mixture slurry and dried, and the coated Al thin film was then roll-pressed to prepare a positive electrode.

Graphite as a negative electrode active material, PVDF as a binder, and carbon black, as a conductive agent, were added in a weight ratio of 96:3:1 to NMP, as a solvent, to prepare a negative electrode mixture slurry. An 8 μm thick copper (Cu) thin film, as a negative electrode collector, was coated with the negative electrode mixture slurry and dried, and the coated Cu thin film was then roll-pressed to prepare a negative electrode.

An electrode assembly was prepared by sequentially stacking the above-prepared positive electrode, a porous polyolefin separator having both surfaces coated with an inorganic material (Al$_2$O$_3$), and the above-prepared negative electrode.

(Secondary Battery Preparation)
After the assembled electrode assembly was put in a battery case and the above composition for a gel polymer electrolyte was injected thereinto, thermal polymerization was performed at 60° C. to prepare a lithium secondary battery including a gel polymer electrolyte.

Comparative Example 4

A liquid electrolyte was prepared by dissolving 0.5 M LiPF$_6$ and 0.7 M LiFSI in a non-aqueous organic solvent (ethylene carbonate (EC): ethyl methyl carbonate (EMC)= volume ratio of 3:7) without an additive.

(Electrode Assembly Preparation)
Li(Ni$_{0.8}$Mn$_{0.1}$Co$_{0.1}$)O$_2$ (NCM) as a positive electrode active material, carbon black as a conductive agent, and polyvinylidene fluoride (PVDF), as a binder, were added in a weight ratio of 95:3:2 to N-methyl-2-pyrrolidone (NMP), as a solvent, to prepare a positive electrode mixture slurry. An about 12 μm thick aluminum (Al) thin film, as a positive electrode collector, was coated with the positive electrode mixture slurry and dried, and the coated Al thin film was then roll-pressed to prepare a positive electrode.

Graphite as a negative electrode active material, PVDF as a binder, and carbon black, as a conductive agent, were added in a weight ratio of 96:3:1 to NMP, as a solvent, to prepare a negative electrode mixture slurry. An 8 μm thick copper (Cu) thin film, as a negative electrode collector, was coated with the negative electrode mixture slurry and dried, and the coated Cu thin film was then roll-pressed to prepare a negative electrode.

An electrode assembly was prepared by sequentially stacking the above-prepared positive electrode, a porous polyolefin separator having both surfaces coated with an inorganic material (Al$_2$O$_3$), and the above-prepared negative electrode.

(Secondary Battery Preparation)
After the assembled electrode assembly was put in a battery case and the liquid electrolyte was injected to prepare a lithium secondary battery.

TABLE 1

| | Positive electrode active material | Organic solvent Type (volume ratio) | Amount added (g) | First lithium salt | Second lithium salt | Mixing ratio (molar ratio) | Polymer Formula | molar ratio of k:(m + n) | Amount added (g) | Polymeric action initiator (amount added g) |
|---|---|---|---|---|---|---|---|---|---|---|
| Example 1 | Li(Ni$_{0.1}$Mn$_{0.1}$Co$_{0.1}$)O$_2$ | EC:EMC = 3:7 | 97 | LiPF$_6$ | LiFSI | 0.5:0.7 | 1a | 78.9:21.1 | 3 | — |
| Example 2 | | | 95 | | | | | | 5 | — |
| Example 3 | | | 90 | | | | | | 10 | |
| Example 4 | | | 99 | | | | | | 1 | |
| Example 5 | LiCoO$_2$ | EC:EMC = 3:7 | 97 | LiPF$_6$ | — | — | 1a | 78.9:21.1 | 3 | — |

TABLE 1-continued

| | Positive electrode active material | Organic solvent Type (volume ratio) | Amount added (g) | Lithium salt First lithium salt | Second lithium salt | Mixing ratio (molar ratio) | Polymer Formula | molar ratio of k:(m + n) | Amount added (g) | Polymeric action initiator (amount added g) |
|---|---|---|---|---|---|---|---|---|---|---|
| Comparative Example 1 | Li(Ni$_{0.1}$Mn$_{0.1}$Co$_{0.1}$)O$_2$ | | 99.9 | | | | 1a | 78.9:21.1 | 0.1 | — |
| Comparative Example 2 | | EC:EMC = 3:7 | 80 | LiPF$_6$ | LiFSI | 0.5:0.7 | | | 20 | — |
| Comparative Example 3 | | | 94.95 | | | | 3 | — | 5 | 0.05 |
| Comparative Example 4 | | | 100 | | | | — | — | — | — |

EXPERIMENTAL EXAMPLES

Experimental Example 1: Measurement of the Presence of Pre-Gelation at Room Temperature The thermosetting electrolyte compositions prepared in Examples 1 to 5, the thermosetting electrolyte compositions prepared in Comparative Examples 1 and 2, and the composition for a gel polymer electrolyte prepared in Comparative Example 3 were respectively put in vials in a glove box having an inner temperature of 25° C., the inside of each vial was filled with argon (Ar) gas, the presence of pre-gelation at room temperature was then observed while each vial was left standing at room temperature (25° C.±5° C.) for about 5 days, and the results thereof are presented in Table 2 below.

Subsequently, after the vials were subjected to a thermal polymerization reaction at 60° C. for 5 hours, polymerization reactivity (whether or not a gel is formed) was visually observed, and the results thereof are presented in Table 2 below.

The presence of pre-gelation at room temperature may be determined by measuring a degree of gelation of a composition for forming a gel polymer electrolyte. That is, if the gelation of the composition for forming a gel polymer electrolyte proceeds, viscosity of the composition increases and transparency decreases. Thus, the measurement of the degree of gelation may be performed by measurement of the viscosity of the composition and observation of the transparency. The measurement of the viscosity may be performed by using a common viscosity measurement device, and the transparency may be measured by visual observation. In this case, the degree of gelation is evaluated with two grades, "no gelation" or "gelation", wherein the "no gelation" denotes a case where there is no change in the viscosity beyond the error range of the viscosity measurements, and a change in the transparency is not observed, and the "gelation" denotes a case where there is a change in the viscosity beyond the error range of the viscosity measurements, or a change in the transparency is observed.

TABLE 2

| | After being left standing for 5 days at 25 ± 5° C. (before polymerization reaction) | | | After thermal polymerization |
|---|---|---|---|---|
| | 1 day | 3 days | 5 days | reaction at 60° C. |
| Example 1 | x | x | x | O |
| Example 2 | x | x | x | O |
| Example 3 | x | x | x | O |
| Example 4 | x | x | x | O |
| Example 5 | x | x | x | O |
| Comparative Example 1 | x | x | x | x |
| Comparative Example 2 | The polymer including the unit represented by Formula 1a was not completely dissolved in the non-aqueous organic solvent. | | | |
| Comparative Example 3 | x | ▲ | O | O |

O: complete gel formation (gelation)
▲: moderate gelation, a state in which a gel and a liquid are partially mixed
x: a gel is not formed (no gelation)

○: complete gel formation (gelation)
▲: moderate gelation, a state in which a gel and a liquid are partially mixed
x: a gel is not formed (no gelation)

Referring to Table 2, with respect to the thermosetting electrolyte compositions of Examples 1 to 5 of the present invention, it may be confirmed that gelation did not proceed when the thermosetting electrolyte compositions were left standing for 5 days at room temperature, but the gelation occurred after the polymerization reaction. From these results, it may be understood that pre-gelation of the composition for a gel polymer electrolyte of the present invention did not occur during injection and wetting processes, but the gelation occurred only during the thermal polymerization reaction for the preparation of the gel polymer electrolyte.

In contrast, it may be understood that pre-gelation of the composition for a gel polymer electrolyte of Comparative Example 3 including the polymerization initiator occurred after being left standing for 3 days at room temperature before the heating reaction.

With respect to the composition for a gel polymer electrolyte of Comparative Example 1 which included a small amount of the polymer including the unit represented by Formula 1a, it may be understood that a gel polymer electrolyte was not formed even after heating.

With respect to the thermosetting electrolyte composition of Comparative Example 2 which included an excessive amount of the polymer including the unit represented by Formula 1a, since the polymer including the unit represented by Formula 1a was not completely dissolved in the non-aqueous organic solvent, measurement was not possible.

Experimental Example 2: Ionic Conductivity Evaluation

Ionic conductivities of the thermosetting electrolyte compositions prepared in Examples 1, 2, 4, and 5, the thermosetting electrolyte composition prepared in Comparative Example 1, and the composition for a gel polymer electrolyte prepared in Comparative Example 3 were measured using a Seven Excellence 5700 instrument by METTLER TOLEDO.

Baths were respectively filled with the thermosetting electrolyte compositions prepared in Examples 1, 2, 4, and 5, the thermosetting electrolyte composition prepared in Comparative Example 1, and the composition for a gel polymer electrolyte of Comparative Example 3 so that probes for measuring ionic conductivity were immersed therein, and thermal polymerization was performed for 5 hours by applying heat of 65° C.

Subsequently, after the temperature of the bath was cooled to 25° C., the ionic conductivity was measured by the immersed probes, and the measured ionic conductivity values (S/m) are presented in Table 3 below.

TABLE 3

|  | Ionic conductivity at 25° C. (S/cm) |
| --- | --- |
| Example 1 | $8.3 \times 10^{-3}$ |
| Example 2 | $6.8 \times 10^{-3}$ |
| Example 4 | $8.5 \times 10^{-3}$ |
| Example 5 | $7.4 \times 10^{-3}$ |
| Comparative Example 1 | $8.9 \times 10^{-3}$ |
| Comparative Example 3 | $6.1 \times 10^{-3}$ |

Referring to Table 3, it may be understood that the ionic conductivities of the thermosetting electrolyte compositions prepared in Examples 1, 2, 4, and 5 were about $6.8 \times 10^{-3}$ S/cm or more, but the ionic conductivity of the secondary battery of Comparative Example 3 was lower at $6.1 \times 10^{-3}$ S/cm while the non-uniform gel polymer electrolyte was formed due to the pre-gelation.

With respect to the composition for forming a gel polymer electrolyte of Comparative Example 1 in which a small amount of the polymer including the unit represented by Formula 1a was included, since it had almost the same phase as that of a liquid electrolyte, it may be understood that its ionic conductivity was excellent at $8.9 \times 10^{-3}$ S/cm.

Experimental Example 3: High-Temperature Stability Evaluation

Hot box tests were performed in which the lithium secondary batteries prepared in Examples 1 to 5 and the lithium secondary batteries prepared in Comparative Examples 1, 3, and 4 were heated to 160° C. at a heating rate of 5° C./min in a fully charged state, i.e., a state of charge (SOC) of 100%, and were then respectively left standing for 30 minutes to confirm the presence of ignition. The results thereof are presented in Table 4 below.

TABLE 4

|  | Presence of ignition | Ignition start time (minutes) |
| --- | --- | --- |
| Example 1 | x | — |
| Example 2 | x | — |
| Example 3 | x | — |
| Example 4 | x | — |
| Example 5 | x | — |
| Comparative Example 1 | o | 15 |
| Comparative Example 3 | o | 25 |
| Comparative Example 4 | o | 20 |

In Table 4, x represents a case where ignition did not occur during storage at 150° C., and O represents a case where ignition occurred during storage at 160° C.

Referring to Table 4, with respect to the lithium secondary batteries of Examples 1 to 5, since stability of an interface between the electrode and the electrolyte was improved by the gel polymer electrolyte even during high-temperature storage at 160° C. in a fully charged state, an exothermic reaction was reduced, and thus, it may be understood that ignition did not occur.

In contrast, with respect to the lithium secondary battery of Comparative Example 3 in which the pre-gelation occurred by the composition for a gel polymer electrolyte including the polymerization initiator, it may be understood that ignition occurred within 25 minutes after the temperature was increased to 160° C.

With respect to the secondary battery of Comparative Example 1 including the thermosetting electrolyte composition, in which a small amount of the polymer composed of the unit represented by Formula 1 was included, and the secondary battery of Comparative Example 4 including the liquid electrolyte, it may be understood that ignitions occurred within 20 minutes after the temperature was increased to 160° C.

That is, since the lithium secondary batteries of Comparative Examples 1 and 4 contained the electrolytes in a liquid state, structural collapse of the positive electrodes occurred when the charged-state positive electrodes were exposed to high temperatures in a state in which lithium ions were deintercalated from the positive electrodes, and oxygen radicals were generated. Since the oxygen radicals thus generated exothermically reacted with the electrolyte in the secondary battery to accumulate heat in the battery and cause thermal shrinkage of the separator, an internal short circuit of the secondary battery occurred and a thermal runaway phenomenon was accompanied, and thus, the batteries were ignited. Therefore, it may be understood that, since high-temperature stabilities of the lithium secondary batteries of the comparative examples, in which interfacial adhesion between the electrode and the electrolyte was not improved, were relatively low, ignitions occurred during the storage at 160° C.

What is claimed is:

1. A thermosetting electrolyte composition for a lithium secondary battery, the thermosetting electrolyte composition comprising:

$LiPF_6$ as a first lithium salt, a non-aqueous organic solvent, and a polymer or oligomer containing: a unit represented by Formula 1, wherein the polymer or oligomer is included in an amount of 0.6 wt % to 15 wt % based on a total weight of the thermosetting electrolyte composition for a lithium secondary battery:

[Formula 1]

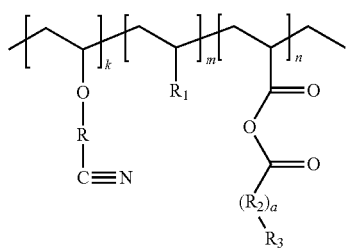

wherein, in Formula 1,

R is substituted or unsubstituted alkylene group having 1 to 5 carbon atoms, $R_1$ is —OH or

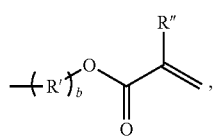

wherein R' is a substituted or unsubstituted alkylene group having 2 to 3 carbon atoms, R" is hydrogen, —OH, or a substituted or unsubstituted alkyl group having 1 to 3 carbon atoms, and b is an integer of 0 or 1, $R_2$ is a substituted or unsubstituted alkylene group having 1 to 5 carbon atoms or a substituted or unsubstituted alkenylene group having 2 to 5 carbon atoms, $R_1$ is a substituted or unsubstituted cycloalkyl group having 3 to 10 carbon atoms which contains a ketone group or a substituted or unsubstituted heterocycloalkyl group having 2 to 10 carbon atoms which contains a ketone group, a is an integer of 0 or 1, and k, m, and n are numbers of repeating units, wherein k is an integer of 1 to 7,000, m is an integer of 0 to 2,000, n is an integer of 1 to 600, and n is not 0

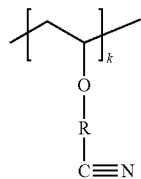

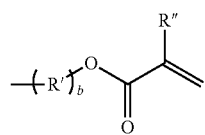

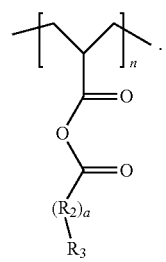

2. The thermosetting electrolyte composition for a lithium secondary battery of claim 1, wherein, in Formula 1, R is an unsubstituted alkylene group having 1 to 3 carbon atoms, $R_1$ is —OH or

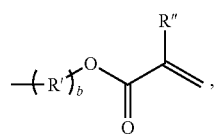

wherein R' is an unsubstituted alkylene group having 1 to 2 carbon atoms, R" is hydrogen, —OH, or an unsubstituted alkyl group having 1 to 2 carbon atoms, and b is an integer of 0 or 1, $R_2$ is a substituted or unsubstituted alkenylene group having 2 to 5 carbon atoms, and $R_3$ is a substituted or unsubstituted heterocycloalkyl group having 2 to 6 carbon atoms which contains a ketone group.

3. The thermosetting electrolyte composition for a lithium secondary battery of claim 1, wherein a ratio of k:(m+n) is in a range of 70:30 to 99:1.

4. The thermosetting electrolyte composition for a lithium secondary battery of claim 1, wherein a molar ratio of k:(m+n) is in a range of 75:25 to 90:10.

5. The thermosetting electrolyte composition for a lithium secondary battery of claim 1, wherein the unit represented by Formula 1 comprises one selected from the group consisting of units represented by Formulae 1a to 1h:

[Formula 1a]

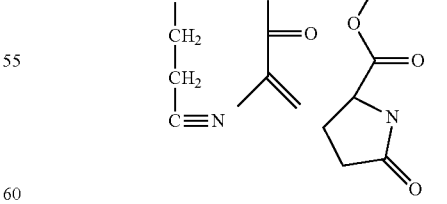

wherein, in Formula 1a, k1, m1, and n1 are numbers of repeating units, wherein k1 is an integer of 1 to 7,000, m1 is an integer of 0 to 2,000, n1 is an integer of 1 to 600, and wherein n1 is not 0,

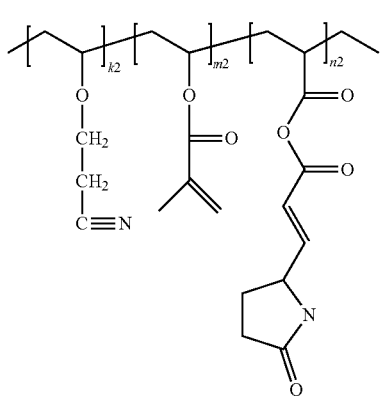

[Formula 1b]

wherein, in Formula 1b,
k2, m2, and n2 are number of repeating units,
wherein k2 is an integer of 1 to 7,000, m2 is an integer of 0 to 2,000, n2 is an integer of 1 to 600, and wherein n2 is not 0,

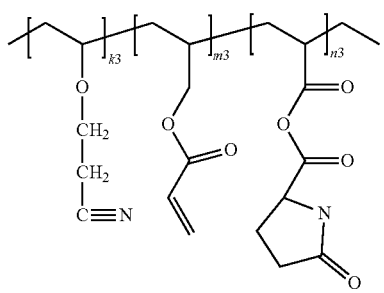

[Formula 1c]

wherein, in Formula 1c,
k3, m3, and n3 are numbers of repeating units,
wherein k3 is an integer of 1 to 7,000, m3 is an integer of 0 to 2,000, n3 is an integer of 1 to 600, and wherein n3 is not 0,

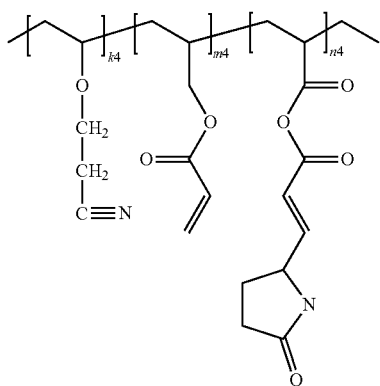

[Formula 1d]

wherein, in Formula 1d,
k4, m4, and n4 are numbers of repeating units,
wherein k4 is an integer of 1 to 7,000, m4 is an integer of 0 to 2,000, n4 is an integer of 1 to 600, and wherein n4 is not 0,

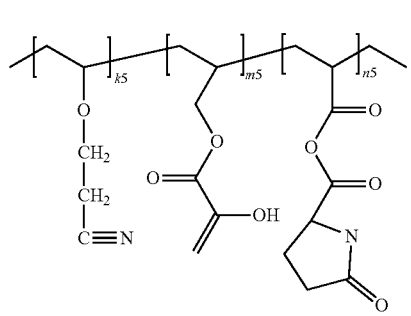

[Formula 1e]

wherein, in Formula 1e,
k5, m5, and n5 are numbers of repeating units,
wherein k5 is an integer of 1 to 7,000, m5 is an integer of 0 to 2,000, n5 is an integer of 1 to 600, and wherein n5 is not 0,

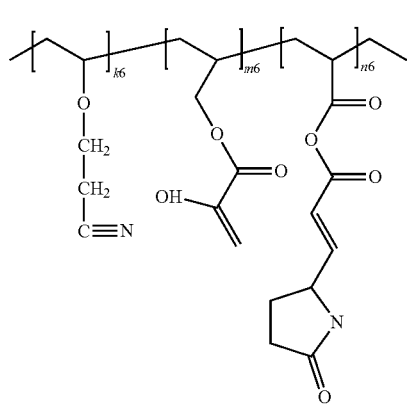

[Formula 1f]

wherein, in Formula 1f,
k6, m6, and n6 are numbers of repeating units,
wherein k6 is an integer of 1 to 7,000, m6 is an integer of 0 to 2,000, n6 is an integer of 1 to 600, and wherein n6 is not 0,

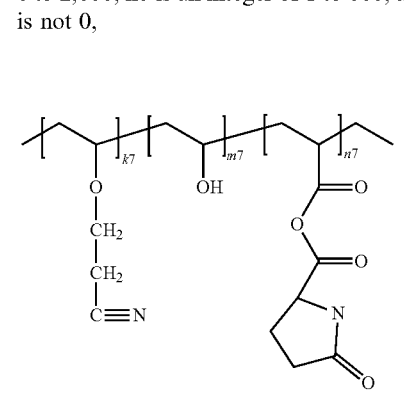

[Formula 1g]

wherein, in Formula 1g,
k7, m7, and n7 are numbers of repeating units,
wherein k7 is an integer of 1 to 7,000, m7 is an integer of 0 to 2,000, n7 is an integer of 1 to 600, and wherein n7 is not 0,

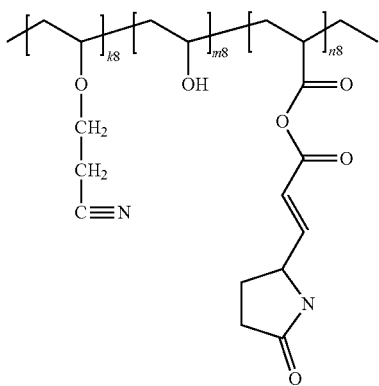

[Formula 1h]

wherein, in Formula 1h,
k8, m8, and n8 are numbers of repeating units,
wherein k8 is an integer of 1 to 7,000, m8 is an integer of 0 to 2,000, n8 is an integer of 1 to 600, and wherein n8 is not 0.

6. The thermosetting electrolyte composition for a lithium secondary battery of claim 1, wherein the unit represented by Formula 1 comprises a unit represented by Formula 1a:

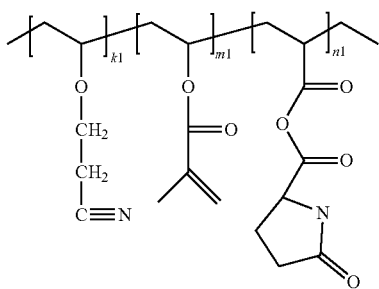

[Formula 1a]

wherein, in Formula 1a,
k1, m1, and n1 are numbers of repeating units,
wherein k1 is an integer of 1 to 7,000, m1 is an integer of 0 to 2,000, n1 is an integer of 1 to 600, and wherein n1 is not 0.

7. The thermosetting electrolyte composition for a lithium secondary battery of claim 6, wherein a ratio of k1:(m1+n1) is in a range of 70:30 to 99:1.

8. The thermosetting electrolyte composition for a lithium secondary battery of claim 6, wherein a ratio of k1:(m1+n1) is in a range of 75:25 to 90:10.

9. The thermosetting electrolyte composition for a lithium secondary battery of claim 1, wherein the polymer or oligomer containing the unit represented by Formula 1 is included in an amount of 1 wt % to 15 wt % based on the total weight of the thermosetting electrolyte composition for a lithium secondary battery.

10. The thermosetting electrolyte composition for a lithium secondary battery of claim 1, further comprising a second lithium salt that is not $LiPF_6$.

11. The thermosetting electrolyte composition for a lithium secondary battery of claim 10, wherein the second lithium salt comprises $Li^+$ as a cation, and comprises at least one anion selected from the group consisting of $F^-$, $Cl^-$, $Br^-$, $I^-$, $NO_3^-$, $N(CN)_2^-$, $ClO_4^-$, $BF_4^-$, $AlO_4^-$, $AlCl_4^-$, $SbF_6^-$, $AsF_6^-$, $BF_2C_2O_4^-$, $BC_4O_8^-$, $PO_2F_2^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

12. The thermosetting electrolyte composition for a lithium secondary battery of claim 11, wherein the second lithium salt is $Li(FSO_2)_2N$.

13. A gel polymer electrolyte for a lithium secondary battery which is prepared by thermal polymerization of the thermosetting electrolyte composition for a lithium secondary battery of claim 1.

14. A lithium secondary battery comprising the gel polymer electrolyte of claim 13.

15. The thermosetting electrolyte composition for a lithium secondary battery of claim 3, wherein $R_1$ is —OH.

16. The thermosetting electrolyte composition for a lithium secondary battery of claim 2, wherein $R_1$ is

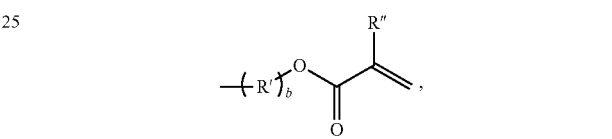

wherein R' is a substituted or unsubstituted alkylene group having 1 to 3 carbon atoms, R" is hydrogen, and b is an integer of 0 or 1.

17. The thermosetting electrolyte composition for a lithium secondary battery of claim 2, wherein $R_1$ is

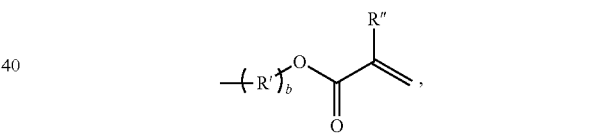

wherein R' is a substituted or unsubstituted alkylene group having 1 to 3 carbon atoms, R" is —OH, and b is an integer of 0 or 1.

18. The thermosetting electrolyte composition for a lithium secondary battery of claim 2, wherein $R_1$ is

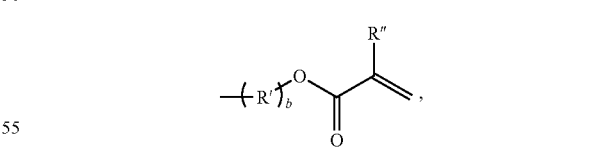

wherein R' is a substituted or unsubstituted alkylene group having 1 to 3 carbon atoms, R" is a substituted or unsubstituted alkyl group having 1 to 3 carbon atoms, b is an integer of 0 or 1.

* * * * *